United States Patent [19]

Adler

[11] Patent Number: 4,713,913

[45] Date of Patent: Dec. 22, 1987

[54] AIR SLIDE POSITIONING FOR GRINDING SPINDLES

[75] Inventor: Meryle D. W. Adler, Corning, N.Y.

[73] Assignee: Corning Glass Works, Corning, N.Y.

[21] Appl. No.: 883,744

[22] Filed: Jul. 9, 1986

[51] Int. Cl.[4] .............................................. B24B 49/08
[52] U.S. Cl. ................................ 51/165.9; 51/165.71;
51/55; 384/12
[58] Field of Search ................... 384/9, 12, 15; 51/55,
51/165.71, 165 TP, 165.4

[56] References Cited

U.S. PATENT DOCUMENTS

| | | | |
|---|---|---|---|
| 1,171,174 | 2/1916 | Corry | 51/55 |
| 1,525,336 | 2/1925 | Svensson | 51/55 |
| 3,466,951 | 9/1969 | Greenberg | 384/12 |
| 3,494,673 | 2/1970 | Wilcox | 384/15 |
| 3,717,392 | 2/1973 | Ennis | 384/12 |
| 4,068,413 | 1/1978 | Suddarth | 51/55 |
| 4,114,959 | 9/1978 | Christ | 384/12 |
| 4,481,023 | 11/1984 | Marechal et al. | |
| 4,504,048 | 3/1985 | Shiba | 384/12 |
| 4,569,562 | 2/1986 | Sato | 384/12 |

FOREIGN PATENT DOCUMENTS 0011331 2/1979 European Pat. Off. .

OTHER PUBLICATIONS

"Moore Precision Turning and Grinding Machines", Moore Special Tool Co., Inc., 1985.

*Primary Examiner*—Harold D. Whitehead
*Attorney, Agent, or Firm*—B. R. Turner; R. E. Kurtz

[57] ABSTRACT

A machine for grinding the cavity in a mold for optical lenses has a spherical grinding tool which is precisely positioned with respect to the center line of a rotary table upon which it is mounted by air slides, which air slides move the tool in orthogonal directions. The carriages of the air slides move relative to center rails. A film of air between the top plate of each air slide and the center rail is supplied at a pressure which supports the weight on the carriage. When precise alignment between the grinding tool and the center line is obtained, a first air supply is cut off and a second air supply is maintained to lock the air slides in the position of alignment.

10 Claims, 6 Drawing Figures

AIR SLIDE POSITIONING FOR GRINDING SPINDLES

BACKGROUND OF THE INVENTION

This invention relates to a machine for grinding a workpiece and more particularly, to an improved air slide for precisely determining the relative position between a grinding tool and the holder for a workpiece.

Precision optical elements may be formed in molds having a precise configuration. U.S. Pat. No, 4,481,023 Marechal and Maschmeyer describes the molding of a glass lens having dimensional tolerances finer than 0.1% and surface figure tolerances finer than 0.2 λ/cm in the visible range of the radiation spectrum. The molds for forming such lenses must have a very precise configuration.

The mold must have a good surface finish, be inert to the glass, and have sufficient rigidity to retain the surface figure at pressing temperature. Mold materials which are suitable for use include 400 series stainless steels, electroless nickel, beryllium nickel alloys, tungsten carbide, alloys of noble metals such as platinum, rodium, and gold, and fused silica.

Heretofore, some such molds of specific composition have been fabricated by a point diamond turning operation, as disclosed in European Patent Application Publication No. 0011331. However, some harder materials, such as the stainless steels, cannot be fabricated into molds by single point diamond turning.

It is an object of the present invention to provide a grinding machine which can be used to fabricate optical lens molds from very hard materials such as stainless steels, tungsten carbide and ceramics.

SUMMARY OF THE INVENTION

The relative position between a spherical grinding tool and a center line of a rotary table upon which it is mounted is accurately determined by air slides which move in orthogonal directions one to the other. By so positioning the tool with respect to the center line or axis of rotation of the table, the tool will be accurately positioned with respect to a work piece when the machine is in its operable mode. These air slides are driven by linear actuators which move the carriages of the air slides in small precise increments. Air is supplied between the upper plate of the carriage and a center rail, on which the carriage rides, at a pressure sufficient to overcome the force generated by the weight on the carriage and a constant air pressure which is applied to the bottom plate and side guides. The grinding tool must be accurately located within very close tolerances to achieve the desired mold shape, and this is accomplished by initially positioning it with respect to the reference center line of the rotating table upon which it is mounted.

In accordance with the invention, when the grinding tool and the center line of the rotary table are positioned in precise alignment, the air is cut off to the upper plate at desired locations to lock the air slide in the alignment position. In this manner, precise alignment is obtained and the tool is locked in the position of precise alignment with respect to the center line when this is achieved.

The invention has important advantages over prior turning and grinding machines. In prior point turning machines, alignment between the cutting tool, and the workpiece was achieved by linear motion of the cutting tool which could be manually operated. The diamond cutting tool is relatively wear-resistant and will retain its cutting edge usually throughout the fabrication of at least one mold. However, the use of grinding wheels, wherein the mold is formed by abrasion, presents a far more complex alignment problem since the grinding wheel tends to wear at a faster rate than a cutting tool, and must be dressed periodically. The relative position between the spherical grinding tool and the workpiece must be adjusted after each dressing of the grinding wheel.

The present invention makes the machine particularly suitable for the precise control which is necessary to achieve the grinding of molds for optical lenses as described in the aforementioned Marechal and Maschmeyer patent.

The foregoing and other objects, features, and advantages of the invention will be better understood from the following more detailed description and appended claims.

SHORT DESCRIPTION OF THE DRAWINGS

DESCRIPTION OF THE PREFERRED EMBODIMENT

Figure 1:
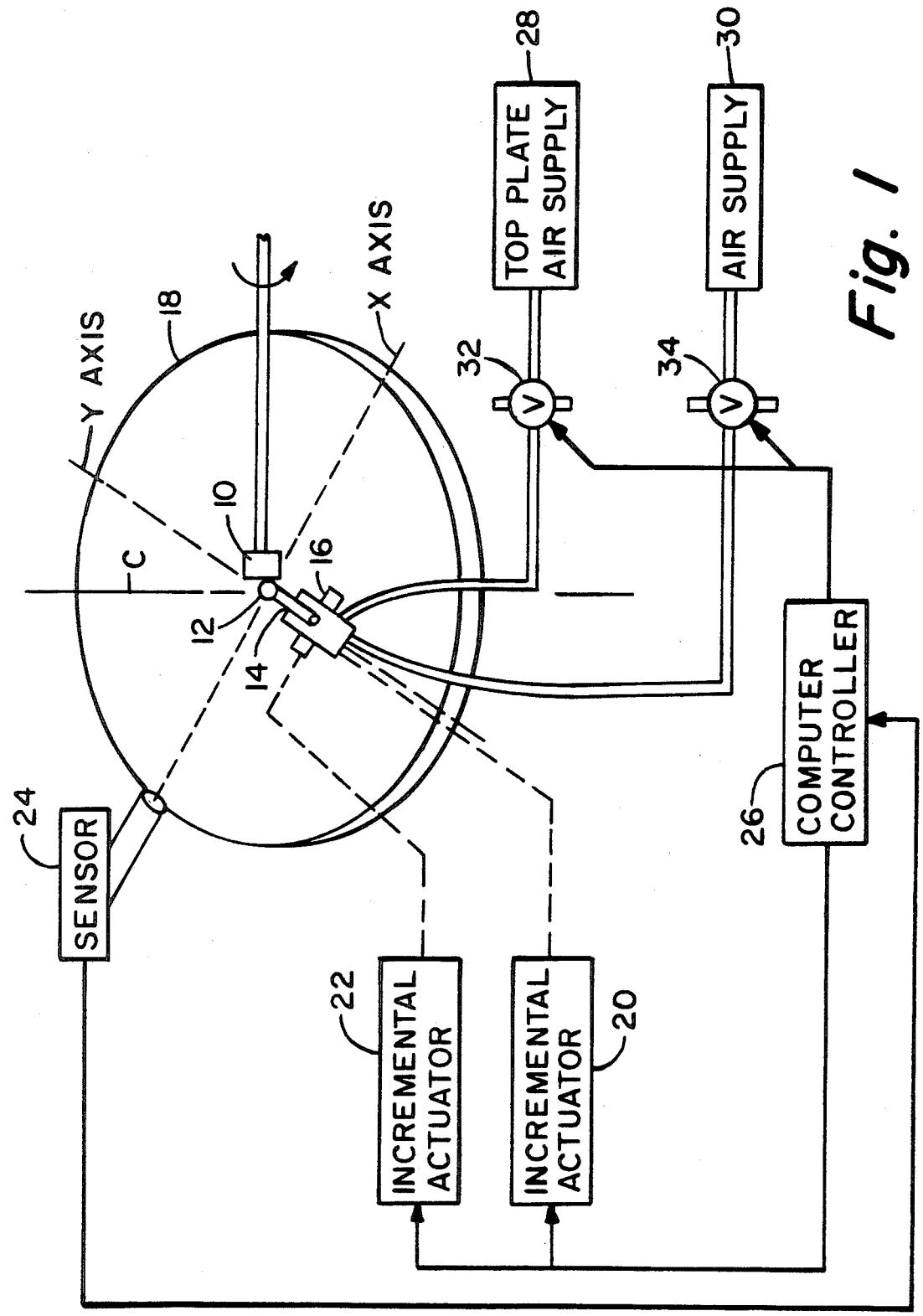
FIG. 1 is a scematic view of the machine of the present invention.

FIG. 1 schematically shows the machine of the present invention for grinding a cavity in a workpiece, which may be a mold for optical lenses. The workpiece is held in holder 10 mounted on a rotating spindle. A spherical grinding tool 12 rotates on a separate spindle which is mounted on a rotary table 18 by means of air slides. The air slides provide a Cartesian coordinate system for positioning the tool 12 with respect to the center line of rotation C of the rotary table 18. The spindle for grinding tool 12 is mounted on air slide 14 movable along a y axis. Y axis air slide 14 has a carriage Cy which is coupled to a carriage Cx of an air slide 16, movable along an x axis. The air slides 14 and 16 are mounted on rotary table 18. The grinding tool 12 is positioned with respect to the center line of rotation of table 18 by linear movement of the carriage Cy by means of air slide 14 along the y axis, and by linear movement of the carriage Cx by means of air slide 16 along the x axis. In order to accurately operate the air slides along the x and y axis and position the carriages, linear actuators 20 and 22, respectively, move the carriages on the air slides 14 and 16 in small precise increments.

Sensors, such as the sensor 24 accurately determine the position of grinding tool 12 with respect to the center line of the rotary table 18. The outputs of the sensors may be applied to a computer controller 26 which controls the incremental actuators 20 and 22 and other components and operations of the machine.

Two independent air supplies 28 and 30 are provided to supply air to each air slide 14 and 16 (only one such set is shown in FIG. 1). A first supply of air 28 for each slide provides a thin film of air between the upper plate of the air slide and the center rail on which the plate rides, and is sufficient to overcome the force generated by the weight on the carriage plus the force generated by the second air supply 30 against the bottom plate. In an exemplary embodiment, the grinding tool 12 must be accurately located within one microinch of the center line axis of rotation C of rotary table 18. Once the tool is located, the first air supply is turned off, and the system is locked into position by means of the second air supply, with no movement due to the grinding forces. That is, the second air supply for each slide is maintained between the rail and the bottom plate to positively lock the top plate and rail in position when the first air supply is turned off, by the force exerted on the top surface of the bottom plate by the second air supply.

In accordance with the present invention, when the tool is precisely aligned with respect to the center line C of the rotary table 18, the first air supply 28 for each air slide is stopped. A set of solenoid valves 32 and 34 for each air slide, which valves may be controlled by computer controller 26, provides means for selectively stopping the supply of air to each air slide and lock it in the position of precise alignment.

Figure 2:
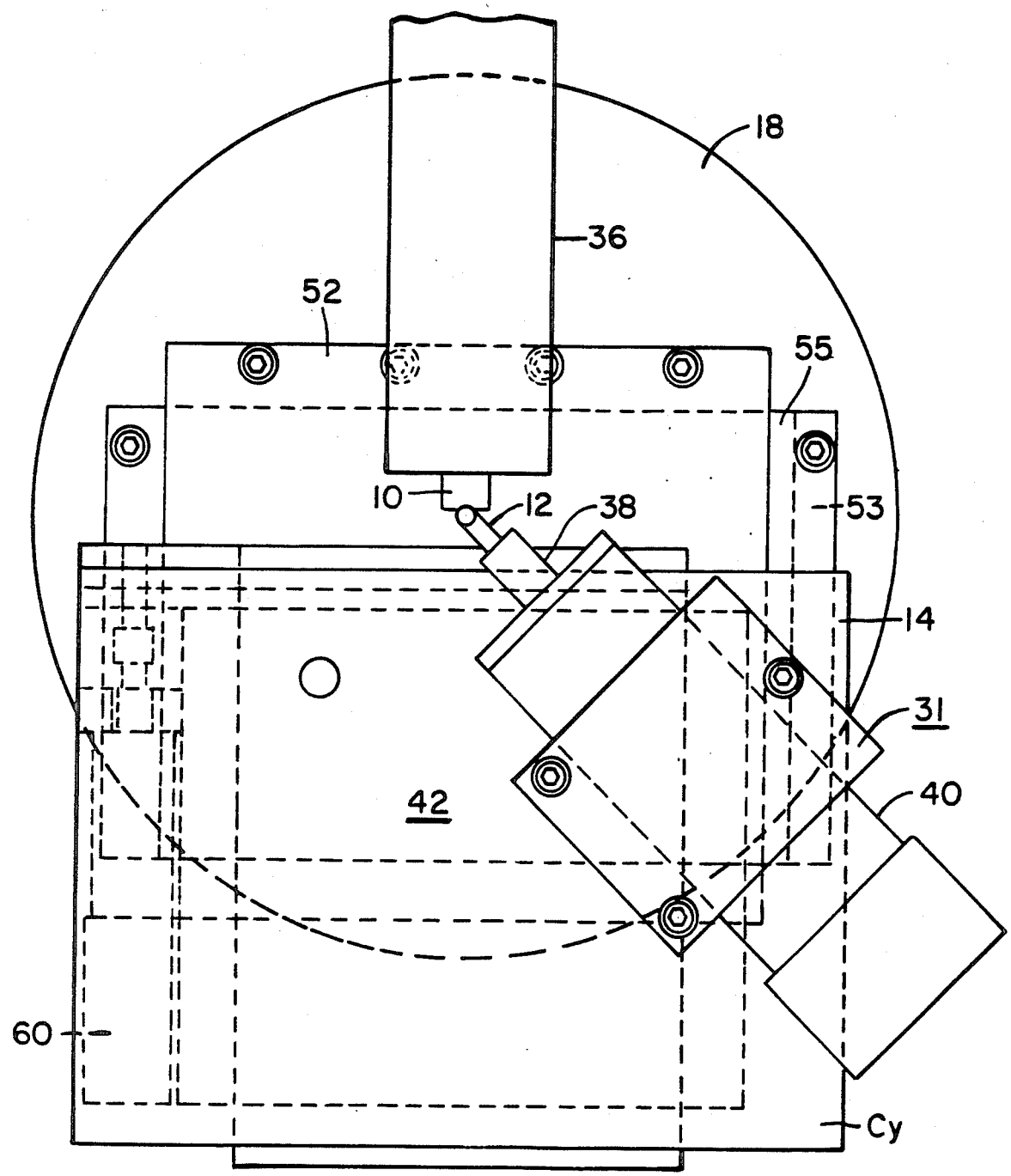
FIG. 2 is a top plan view of the machine in its operable mode.
Figure 3:
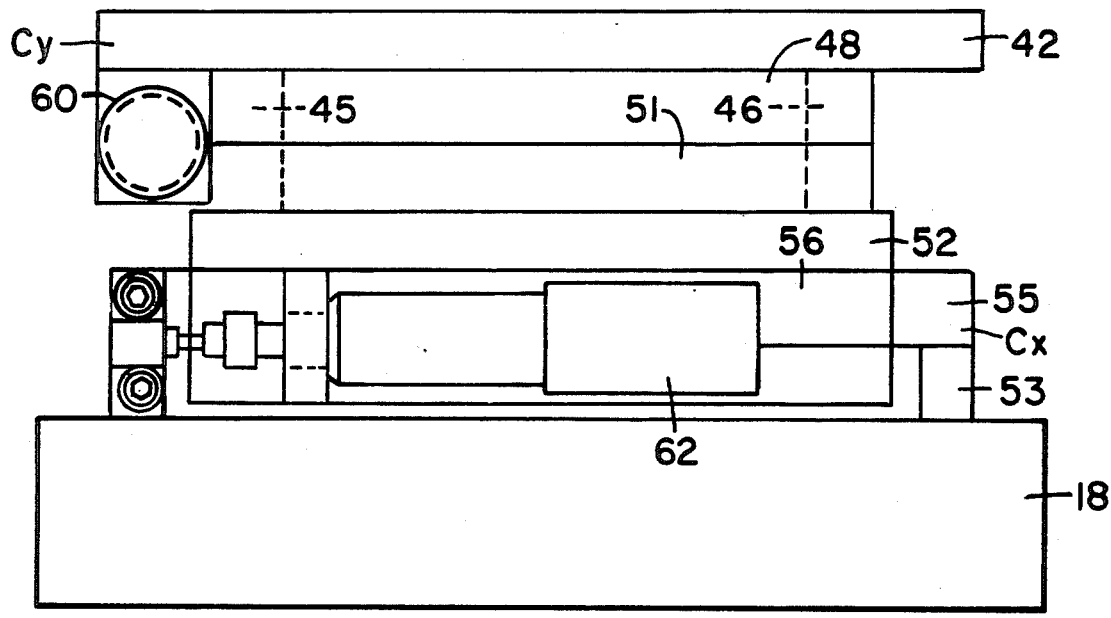
FIG. 3 is an end view of FIG. 2 with the spindle assembly omitted.
Figure 4:
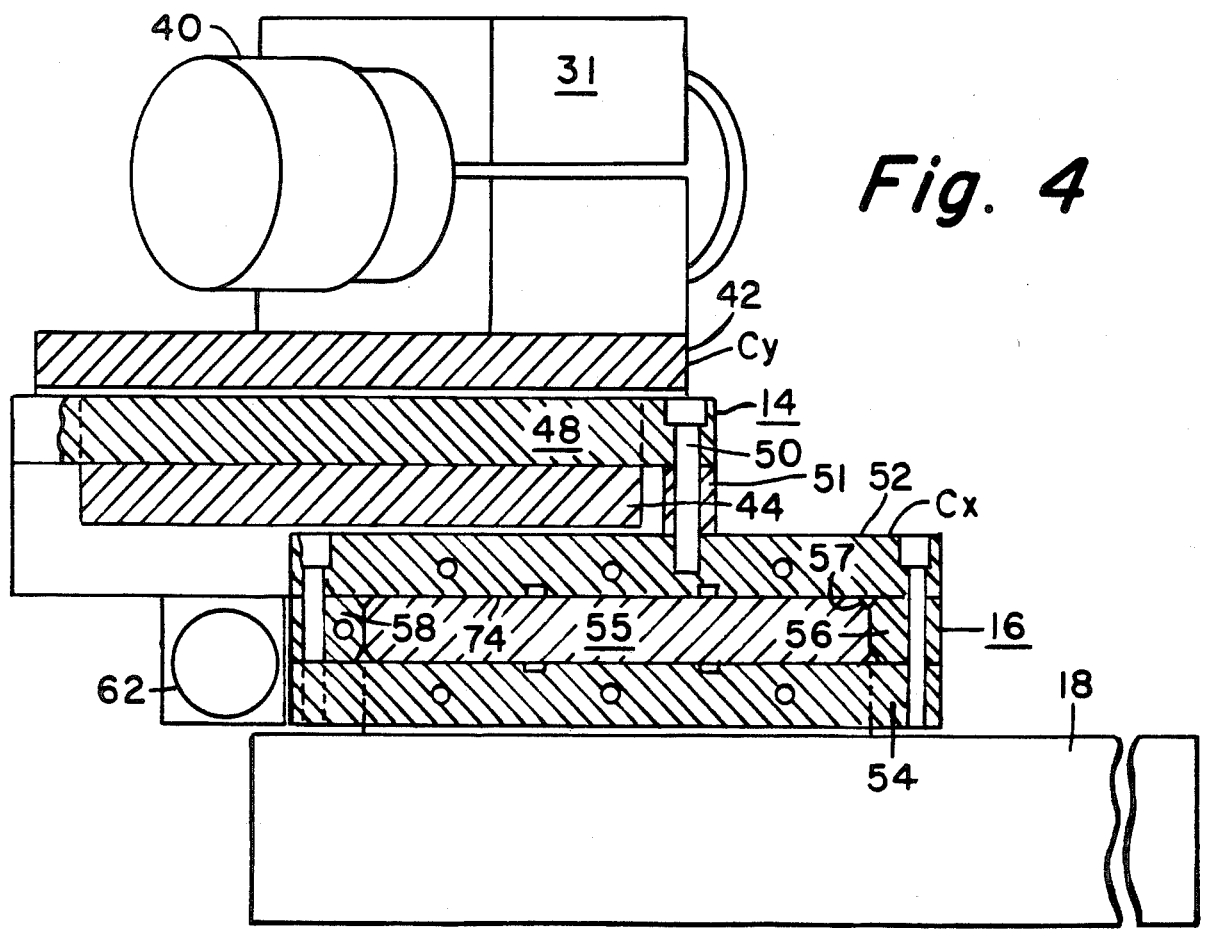
FIG. 4 is a side view, partially in section, of the machine of FIG. 2.

FIGS. 2–4 show the machine of the present invention in more detail. Holder 10 is mounted on spindle 36 and grinding tool 12 is mounted on spindle 38. Spindle assembly 31, including spindle motor 40 is mounted on the carriage Cy of the y axis air slide 14. The carriage Cy of air slide 14 includes upper plate 42, bottom plate 44, and two side guides 45 and 46 (see FIG. 3). The carriage Cy moves linearly on a center rail 48 of air slide 14. Center rail 48 is coupled to a carriage Cx of the x axis air slide 16 by means including bolt 50 and spacer 51. The carriage Cx includes an upper plate 52 and bottom plate 54 which slide on center rail 55, and side guides 56 and 58. Center rail 55 of air slide 16 is mounted on table 18 through spacer 53. The side guides 45, 46 and 56, 58 maintain the lateral stability of the slides during positioning, and also permit the top plates to move downwardly upon the rails without a sidewise-lateral movement when the first air supply is turned off.

The carriage Cy of y axis air slide 14 rides on a thin film of air supplied between upper plate 42 and center rail 48 at a pressure sufficient to overcome the force generated by the weight on the carriage and the second air supply 30. As previously mentioned, air is also continuously supplied from a second independent source (such as air supply 30 for each slide) to side guides 45 and 46 and bottom plate 44 of carriage Cy and to side guides 56 and 58 and bottom plate 54 of carriage Cx. During the independent positioning of each carriage (Cy, Cx), air flows between the surfaces of center rail (48,55) and inner surfaces of upper and bottom plates (42,52) and (44,54) and the inner surfaces of the sides guides. First one tool axis is positioned over the center line C of the table 18, and then the other axis is so positioned. When each is so positioned, the first air supply is shut off to lock the slide in its set position.

When air is supplied between the upper plate 42 and the rail 48, the carriage Cy moves easily on the center rail 48. In an exemplary embodiment, an air pressure of approximately 50 psi was maintained over the surface of a top plate having dimensions of approximately 10"×7¼". With this air pressure and flow, the carriage rode approximately 10 microinches above the rail. The carriage cy is easily moved by means of linear actuator 60 along the y axis air slide 14, and by means of linear actuator 62 along the x axis air slide 16, which positions carriage Cx upon which carriage Cy is mounted. In an exemplary embodiment, these linear actuators are Burleigh Inchworm type linear actuators. These actuators move linearly in increments of 0.0000005" (one half millionth of an inch). The linear actuators 60 and 62 can be computer controlled.

Figure 6:
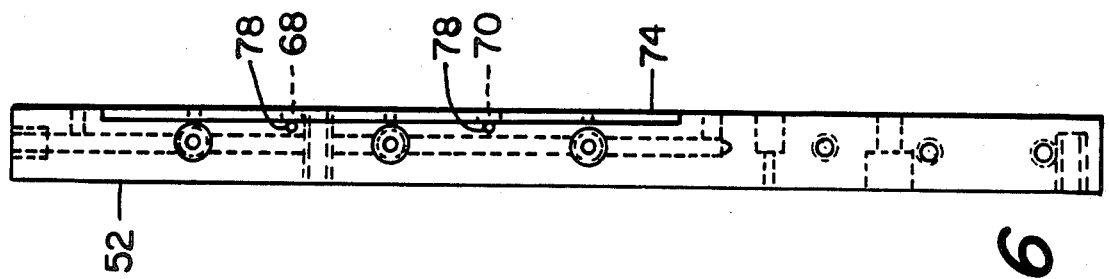
FIG. 6 is an end view of the upper plate of FIG. 5.
Figure 5:
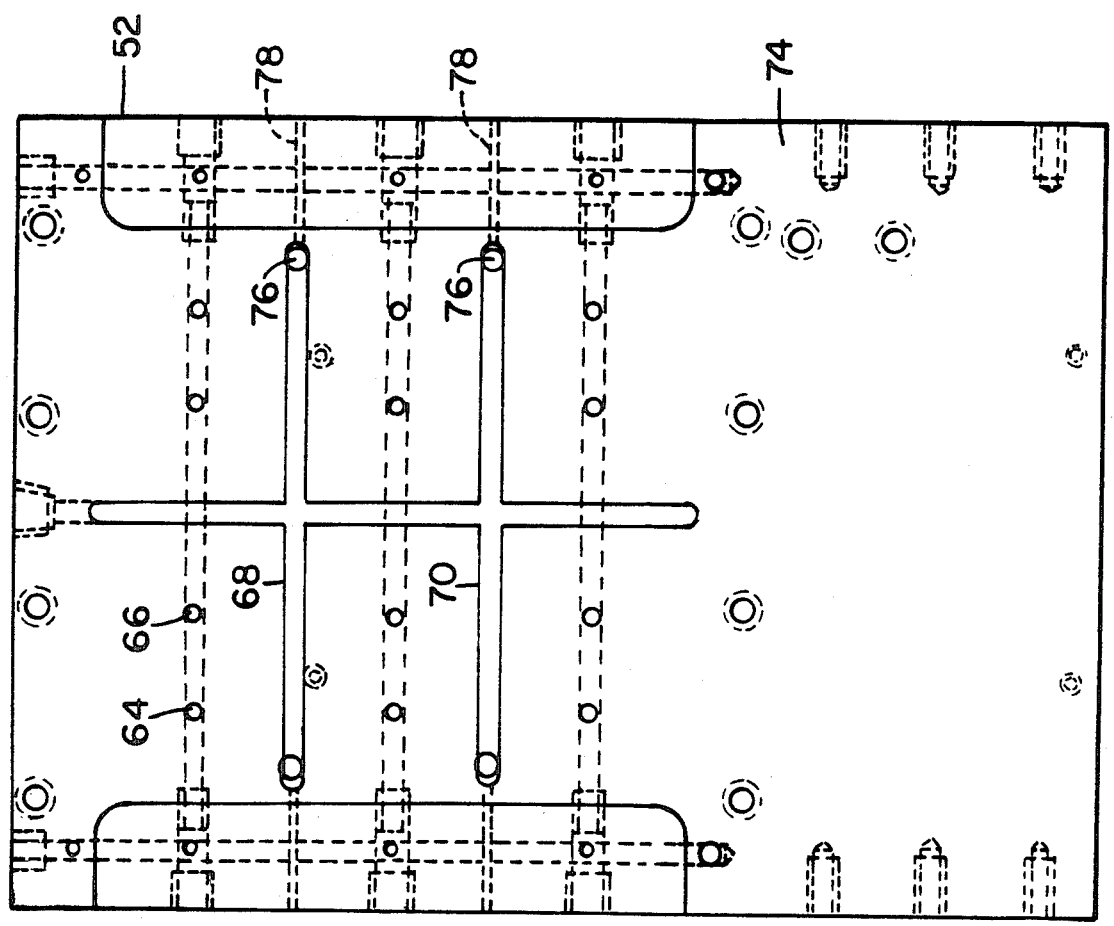
FIG. 5 is a plan view of an upper plate for a carriage portion of the machine showing the air holes and the venting grooves.

FIGS. 5 and 6 show the upper plate 52 of the x axis air slide. Air holes 64, 66 and others, which may be manifolded by passages in the side guides, each supply air to the inner surface 74 of the plate, which adjoins the center rail 55. The location of the air holes is chosen so that the boundary area over which air flows from each hole overlaps with the adjoining boundary area. In this way, the entire surface of the plate is supported by a thin film of air. This air flows to the grooves 68 and 70 through which the air escapes to atmosphere via passages 76, 78 to the edge of the plate. It is understood that upper plate 42 of the y axis air slide, and bottom plates 44, 54 respectively of the y and x air slides, also are provided with similar air holes and grooves, as well as the side guides 45, 46, 56, 58. In fact, the side guides may be beveled, such as shown at 57 (FIG. 4) to facilitate the venting of air to the atmosphere.

While a particular embodiment of the invention has been shown and described, various modifications are within the true spirit and scope of the invention, including the fact that the air slides may be utilized to position cutting tools as well as grinding tools. The appended claims are, therefore, intended to cover all such modifications.

What is claimed:

1. In a machine for shaping a workpiece, said machine having a tool and holder for said workpiece, an improved air slide for precisely determining the relative position between said tool and a center line of a rotary table upon which it is mounted comprising:
    a center rail;
    a carriage mounted for linear travel on said rail, one of said tool and said holder being mounted on said carriage;
    said carriage comprising an upper plate, two side guides and a bottom plate;
    means for directly supplying a thin film of air between said center rail and said carriage not greater than about 10 microinches so that said carriage can be moved linearly on said rail to precise alignment between said tool and said center line of said rotary table;
    said means for supplying a thin film of air directly to said carriage including two independent air supplies, a first supply at a first pressure for said upper plate and a second supply at a lesser second pressure for said side guides and bottom plate, and said first supply having a first pressure greater than the pressure of said second supply sufficient to overcome the force generated by the weight on said carriage and the force of air from said second supply on the top surface of said bottom plate;
    means for selectively stopping the supply of said air to lock said carriage on said rail in the position of said precise alignment; and
    said means for selectively stopping the supply of aid air includes a valve for stopping said first supply of air to said upper plate wherein the force of air from said second supply locks said carriage in place when said first supply of air is stopped, without materially affecting the flow of air from said second supply.

2. The machine recited in claim 1 further comprising:
two of said improved air slides for providing relative movement in two orthogonal directions between said tool and said center line, the carriages of said two air slides being coupled one to the other.

3. The machine recited in claim 2 wherein said tool is mounted on the coupled carriages of said two air slides.

4. The apparatus recited in claim 1 further comprising:
linear actuators for moving the carriage of said air slides, said linear actuators moving said carriages in small precise increments.

5. The apparatus recited in claim 4 further comprising:
a computer controller for controlling said linear actuators to position said grinding tool with respect to said holder.

6. The apparatus recited in claim 5 further comprising:
solenoid actuated valves between said means for supplying air and said air slide, said computer controller controlling said solenoid valves to lock said air slide in the position of precise alignment.

7. An improved air slide for precisely determining the relative position between a tool and a predetermined reference comprising:
a center rail;
a carriage mounted for linear travel on said rail, one of said tool and said predetermined reference being mounted on said carriage;
said carriage including an upper plate, guide members and a bottom plate;
means within said carriage for supplying a thin film of air not greater than about 10 microinches between said center rail and said carriage so that said carriage can be moved linearly on said rail to precise alignment between said tool and said predetermined reference;
said means for supplying the thin film of air includes two independent air supplies, a first supply at a first pressure for said upper plate and a second supply at a lesser second pressure for said side guide members and bottom plate, said first supply being directed between the surface of said upper plate and said center rail at a first pressure which is sufficient to overcome the force generated by the weight of said carriage and the force of air at a lesser pressure from the second supply on the top surface of the bottom plate; and
means for selectively stopping the supply of air from said first supply to deplete the thin film of air between said upper plate and said carriage so that the air from the second supply, reacting on the top surface of said bottom plate, causes the bottom surface of said top plate to move through the space formerly taken by the thin film and engage said rail to lock said carriage on said rail in a position of said precise alignment, without materially altering the flow from said second supply.

8. The improved air slide recited in claim 7 and another of said air slides coupled thereto, said air slides providing relative movement in two orthogonal directions between said tool and said predetermined reference.

9. The improved air slide recited in claim 8 wherein said tool is mounted on the coupled carriages of said two air slides.

10. The improved air slide recited in claim 7 wherein said upper plate, said guides and bottom plate have air holes which supply said air between such surfaces, and grooves adjacent said holes receive and vent such air to the edge of said guides and plates so that air flows between the surface of said rail and the inner surfaces of said upper and bottom plates and said side guides.

* * * * *